United States Patent [19]
Kirby et al.

[11] Patent Number: 5,308,132
[45] Date of Patent: May 3, 1994

[54] CIRCUIT ASSEMBLY DEVICE FOR PROGRAMMABLY CONTROLLING PLACEMENT FORCE AND METHOD THERETO

[75] Inventors: Thomas P. Kirby; Christopher L. Becher; David H. Rubin, all of Boynton Beach, Fla.

[73] Assignee: Motorola, Inc., Schaumburg, Ill.

[21] Appl. No.: 956,198

[22] Filed: Oct. 5, 1992

[51] Int. Cl.⁵ .......................... B25J 15/06; B66C 1/02
[52] U.S. Cl. .................................. 294/64.1; 294/88; 294/907; 901/37; 901/40; 29/743
[58] Field of Search .................. 294/64.1, 88, 907; 901/40, 37, 45, 46; 414/737; 29/743

[56] References Cited

U.S. PATENT DOCUMENTS

| | | |
|---|---|---|
| 2,630,192 | 3/1953 | Funkhouser . |
| 2,771,968 | 11/1956 | Mercier . |
| 3,368,697 | 2/1968 | Carlson . |
| 3,654,613 | 4/1972 | Dunne et al. . |
| 4,266,905 | 5/1981 | Birk et al. ............... 294/64.1 X |
| 4,600,228 | 7/1986 | Tarbuck ................... 294/64.1 |
| 4,657,470 | 4/1987 | Clarke et al. ............ 294/64.1 X |
| 4,750,768 | 6/1988 | Kumar ..................... 294/64.1 |
| 5,029,383 | 7/1991 | Snyder et al. ........... 294/64.1 X |
| 5,044,868 | 9/1991 | Bennison ................. 294/64.1 X |
| 5,201,875 | 4/1993 | Tessier et al. ........... 294/64.1 |

FOREIGN PATENT DOCUMENTS 1303399 4/1987 U.S.S.R. .
1349999 11/1987 U.S.S.R. .

*Primary Examiner*—Dean J. Kramer
*Attorney, Agent, or Firm*—Keith A. Chanroo; Thomas G. Berry

[57] ABSTRACT

A robotic placement device (FIG. 1) comprises a programmable end-effector (200) for picking and placing component parts. The programmable end-effector (200) comprises a cylinder (201) having a piston (202) including a first (203) and second (208) shafts coupled together. The first shaft (203) of the piston is larger than the second shaft (208). A controller (102) controls a pressure applied to the cylinder (201) and the piston (202) including the first (203) and second (208) shafts of the programmable end-effector (200) establishes a predetermined placement force at the programmable end-effector (200) while placing component parts. A control circuit 118 senses the pressure and in response thereto generates a signal. A processor 108 coupled to the controller (102) processes the signal and in response thereto varying the pressure for maintaining a substantially constant placement force at the programmable end-effector (200) while the programmable end-effector (200) moves vertically.

10 Claims, 4 Drawing Sheets

CIRCUIT ASSEMBLY DEVICE FOR PROGRAMMABLY CONTROLLING PLACEMENT FORCE AND METHOD THERETO

FIELD OF THE INVENTION

This invention relates in general to circuit assembly devices and more particularly a circuit assembly device and method for programmably controlling placement force.

BACKGROUND OF THE INVENTION

Typically, in an automated factory, precise measurements of manufacturing and processing are invaluable to the efficiency of the manufacturing process and the quality of the products produced. Ideally, devices used for holding and placing products or component parts to be processed in a robotic operated factory need to be automatically operated to facilitate hands-free operations or eliminate human interventions as much as possible. This improves the speed of manufacturing or processing time and reduces injury to, or mistakes by, human operators. In this way, an automated factory ultimately produces higher quality products at lower manufacturing cost, which tends to increase profits to companies or reduce cost to consumers allowing domestic companies to be more competitive in world markets.

Usually, an automated factory produces high quality products by using the latest available technology in its internal manufacturing operations. However, a company focusing only on its own product manufacturing capabilities will not maintain its competitive edge for a sufficiently long time. That is, although it is important to achieve superiority in its internal manufacturing operations, to be a true leader, companies must be aware that products purchased from outside vendors may not always conform to the higher quality standards of their internal factory operations. With this awareness, it is of paramount importance to design for a reasonable variation in goods purchased from outside vendors. In this way, time-consuming operations are avoided when products vary without their design tolerances.

Especially in robotic end-effectors, for example, a multi-functional end-effector must have a reasonable tolerance built in to compensate for variations in components size or over-travel by individual end-effectors, etc. Typically, this tolerance is accomplished with the aid of springs, which allow the end-effectors to vary within a limited range when there is an inadvertent contact by an end-effector on a component or part. Unfortunately, to increase or decrease the range of variation, the spring must be changed to precisely match the new desired range because variation in the range produces substantial variation in the force being applied to the components to be picked up and placed. Also, springs subjected to high mechanical stress from continuous use will often fail because of metal fatigue.

Accordingly, a need exists for a quick and efficient method and apparatus for compensating for variations which permits placement operations at several different vertical positions while maintaining the same placement force on the component parts being placed.

SUMMARY OF THE INVENTION

A robotic placement device comprises a programmable end-effector for picking and placing component parts. A controlling means controls a pressure applied to the programmable end-effector establishing a predetermined placement force at the programmable end-effector while placing component parts. A means that senses the pressure and generates a signal in response thereto. A processing means, coupled to the controlling means, processes the signal and varies the pressure in response thereto for maintaining a substantially constant placement force at the programmable end-effector while the programmable end-effector moves vertically.

In a robotic placement device, a method for controlling the placement force, comprises the steps of:
  (a) applying a pressure to a programmable end-effector of the robotic placement device for establishing a predetermined force at a tip of the programmable end-effector, the programmable end-effector having a piston coupled to the tip of the programmable end-effector wherein the applied pressure causes the piston to move thereby exerting the predetermined force on component parts being placed;
  (b) sensing variations in the applied pressure;
  (c) controlling an input and an exhaust to the pressure in response to step (b) for compensating for any variations in the applied pressure thereby permitting the piston to move in a vertical direction while maintaining the predetermined force at the tip of the programmable end-effector as the piston moves vertically.

DESCRIPTION OF A PREFERRED EMBODIMENT

Figure 1:
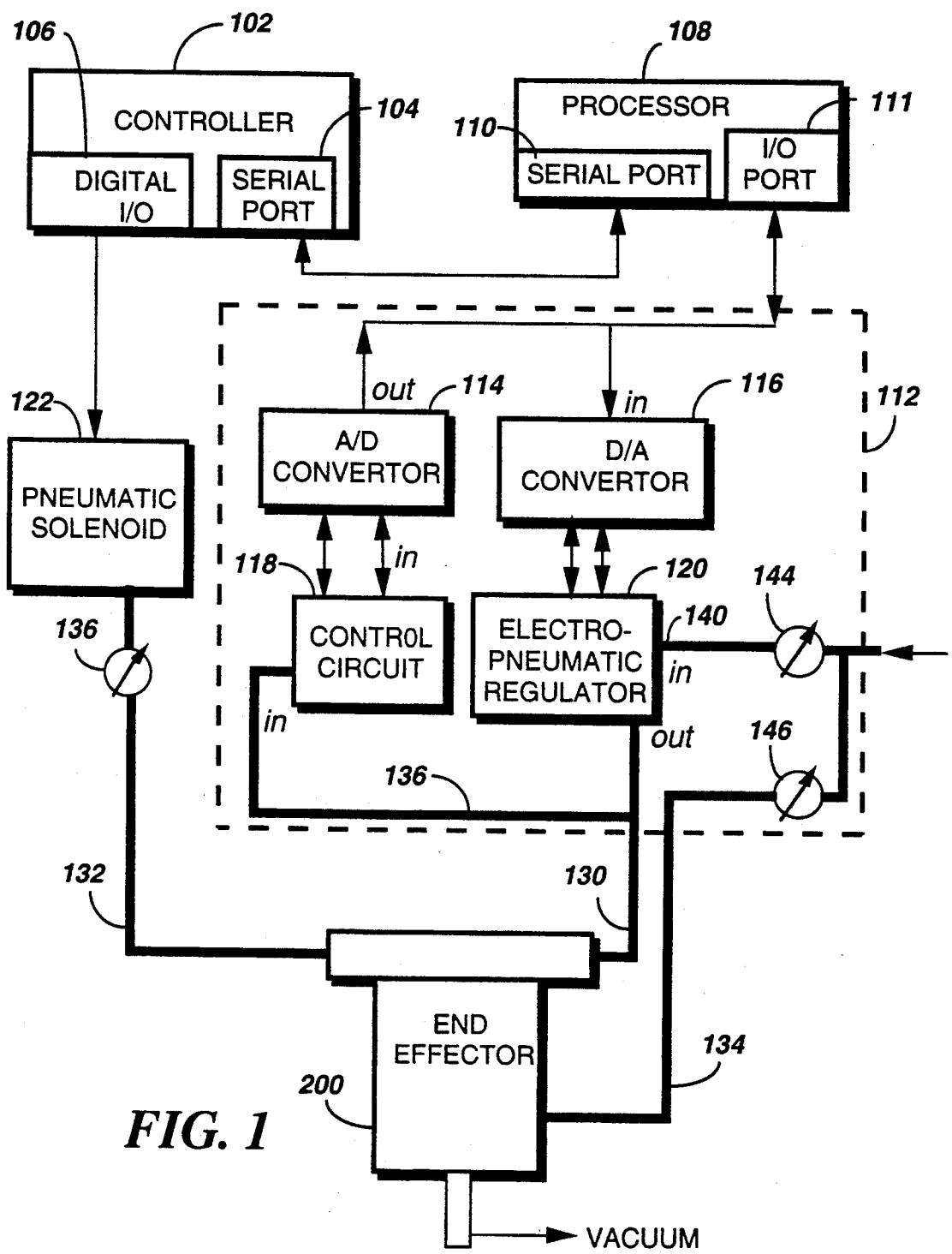
FIG. 1 is a control block diagram of the programmable end-effector in accordance with a preferred embodiment of the present invention.

Referring to FIG. 1, a control diagram for a programmable end-effector is shown in accordance with the preferred embodiment of the present invention. A robot controller 102, for example, a Seiko Instruments RT or XM robot, is shown which includes a digital input-output port (I/O) port 106 coupled to a pneumatic interface 122 for controlling a pressure regulator (not shown). The robot controller 102 provides preferably a digital signal to a pneumatic solenoid 122 which switches pressure to the regulator to provide air pressure to port 224 (FIG. 2) for up/down actuation. A valve 136 limits the air pressure preferably between 5-to-10 pounds-per-square-inch, psi (or 351.85–703.7 gm/cm$^2$) from the pneumatic solenoid 122. A serial port 104, such as an RS232 port, of the robot controller 102 is coupled to a serial port 110 of a processor 108, for example, a digital computer such as MACINTOSH computer as manufactured by Apple Computer, for facilitating the flow of control information. The processor 108 via an I/O port 111 provides and receives electrical signals from a control panel 112. Specifically, the control panel 112 includes a Digital-to-Analog Convertor (D/A) 116, preferably a 16-bits resolution D/A, which produces an analog representation of a digital signal received by techniques well known in the art. The analog signal, preferably 0-10 volts signal, is applied to an electro-pneumatic regulator 120 which regulates the air pressure in a range of 0-15 pounds-per-square-inch, psi (or 0-1055.55 gm/cm$^2$) being applied by line 140 through a 20-30 psi (or 1407.4-2111.1 gm/cm$^2$) valve 144 from a main supply (not shown). According to the analog signal applied, the electro-pneumatic regulator 120 regulates air pressure with the range from 0-15 psi (or 0-1055.55 gm/cm$^2$). The pressure at the output line 130 received from line 140 is controlled with extreme precision by the electro-pneumatic regulator 120. Line 136 is fed back to a control circuit 118 which is coupled to the electro-pneumatic regulator 120 for confirming when the resulting pressure is equal to the required pressure for establishing the desired placement force at the tip of the programmable end-effector. The control circuit 118 produces an electrical signal which is responsive to the pressure, the electrical signal being converted to a digital signal by preferably a 12 bits resolution Analog-to-Digital (A/D) convertor 114. The A/D 114 is coupled to the processor 108 via the serial port 110 (RS232 port) for processing the digital signal to determine when the pressure at line 136 (similarly line 130) is equal to the desired pressure. Line 134 includes a 30 psi (or 2111.1 gm/cm$^2$) valve 146 which is coupled to an air bearing which is discussed in detail below.

Once the desired pressure is established, the programmable end-effector, when placing component parts, exerts a predetermined amount of force produced by precision air pressure regulation. Feedback from a transducer of the electro-pneumatic regulator 120 verifies that the correct force is "loaded" before contact. Accordingly, the end-effector of the robot exerts the same force on the component part being placed literally in any position on the vertical axis of the compliance of the end-effector. This placement force is independent of the compliance and is applied on the component part thereby eliminating z-coordinate (the vertical movement) from the list of critical placement criteria.

Figure 2:
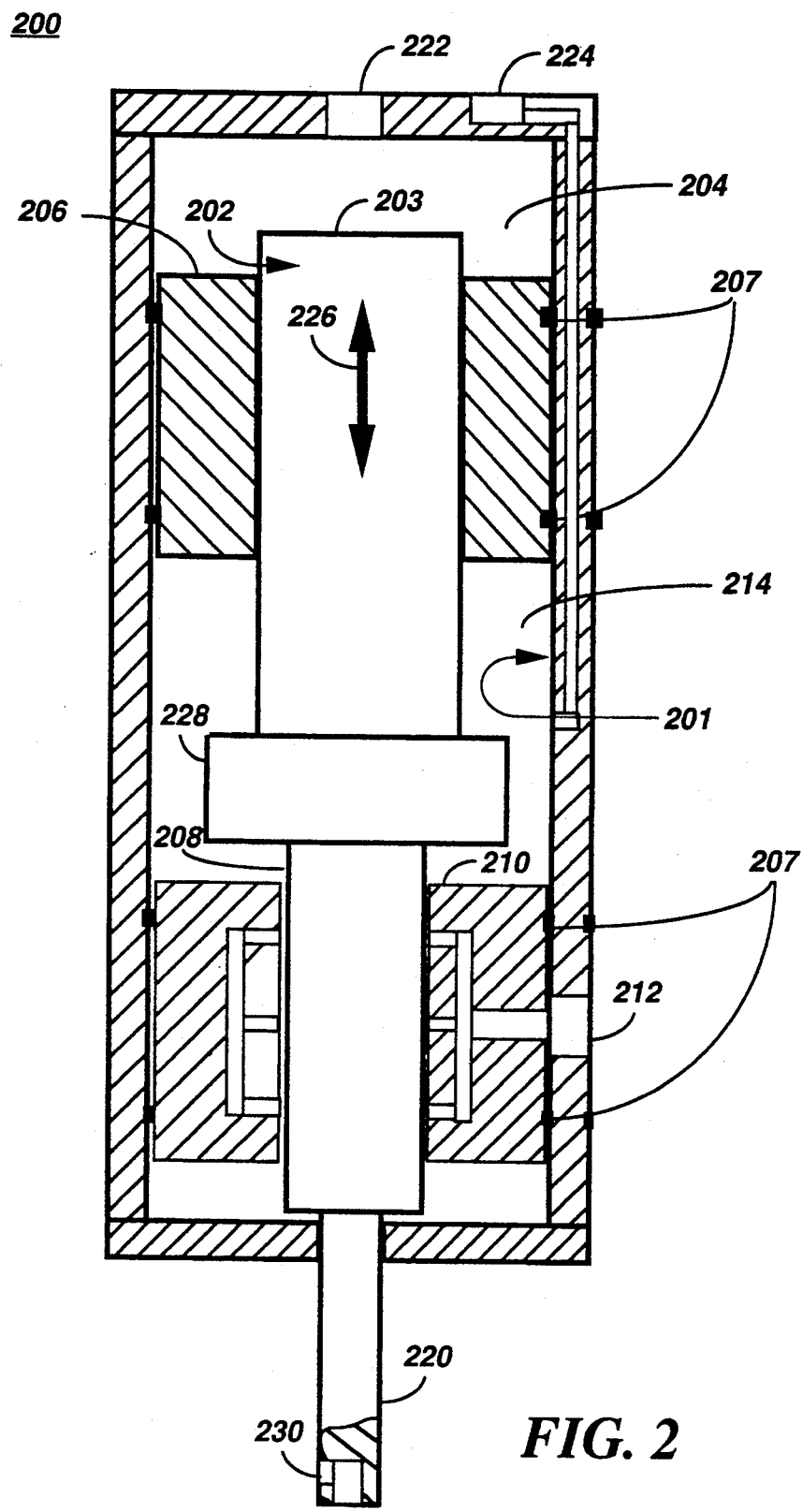
FIG. 2 is a cross-sectional side view illustrating the preferred embodiment of the programmable end-effector of FIG. 1 with the pressure being disabled in the programmable end-effector.

FIG. 2 is a cross-sectional side view illustrating the programmable end-effector of FIG. 1 with the piston 202 in the lower position. With reference to FIG. 1, line 130 is coupled to port 222, line 132 is coupled to port 224, and line 134 in coupled to port 212. Structurally, the programmable end-effector 200 comprises a cylinder 201 having an internal and external wall, the internal wall (or surface) is moveably coupled to the piston 202 with the aid of a bushing 206 and an air-bearing 210 which are sealed by O-ring seals 207. The piston 202 comprises two shafts 203, 208 coupled together. The two shafts 203, 208 preferably have two different sizes which are coupled via a coupler 228. The piston 202 further includes a tip 220 which permits a vacuum to be connected to the tip 220 as shown by a slot 230. The vacuum when applied to slot 230, as is well known, permits the programmable end-effector to pick up component parts to be placed on, for example, a circuit board, etc. The bushing 206 coupled to the internal wall of the cylinder 201 permits the larger shaft 203 of the piston 202 to slidably (moveably) couple within the bushing 206 which enables the piston to move vertically as shown by directional arrow 226. The bushing 206 also divides the cylinder 201 into two chambers 204, 214 which are sealed by the O-ring seals 207. The upper chamber 204 encloses the larger shaft 203. The lower chamber 214 encloses the coupler 228 which is also permitted to move vertically. The second shaft 208 is moveably coupled to the air bearing 210. The air bearing 210 includes the port 212 which permits air to enter from the main air supply (not shown) for enabling the piston to move without making metal-to-metal contact thereto. Specifically, the port 212 has symmetrically air ducts located such that an equal and symmetrical force is applied to the second shaft 208 which provides an equidistance placement of the shaft 208 within the air-bearing 210 for providing a substantially friction-free coupling therebetween when the air enters the opening 212 of the air bearing, thereby forcing the shaft 208 to a central location within the air bearing 210.

The upper chamber 204 receives the programmable controlled air pressure through port 222 which causes a force (the placement force) to be exerted on the piston 202 thereby forcing the piston 202 down. As will be discussed, when the correct pressure is verified, the force being exerted on the piston, irrespective of the point of contact within the vertical plane of the component being placed, remains constant. Also, as the piston 202 moves up or down (vertically), the pressure applied through port 222 is varied to maintain the constant placement force at the tip 220 of the programmable end-effector 200. The lower chamber 214 also receives an air pressure via the port 224 for moving the piston 202 upwards subsequent to the placement of the component part. Specifically, because the piston 202 comprises the two shafts 203, 208, one being larger than the other, when the air pressure is applied to the second chamber 214, a force, because of the difference in areas of the two shafts 203, 208, will move the piston 202 upward when the air pressure at port 222 is disabled. Additionally, directional arrow 226 illustrates the direction of movement of the piston 202 within the programmable end-effector 200.

Figure 3:
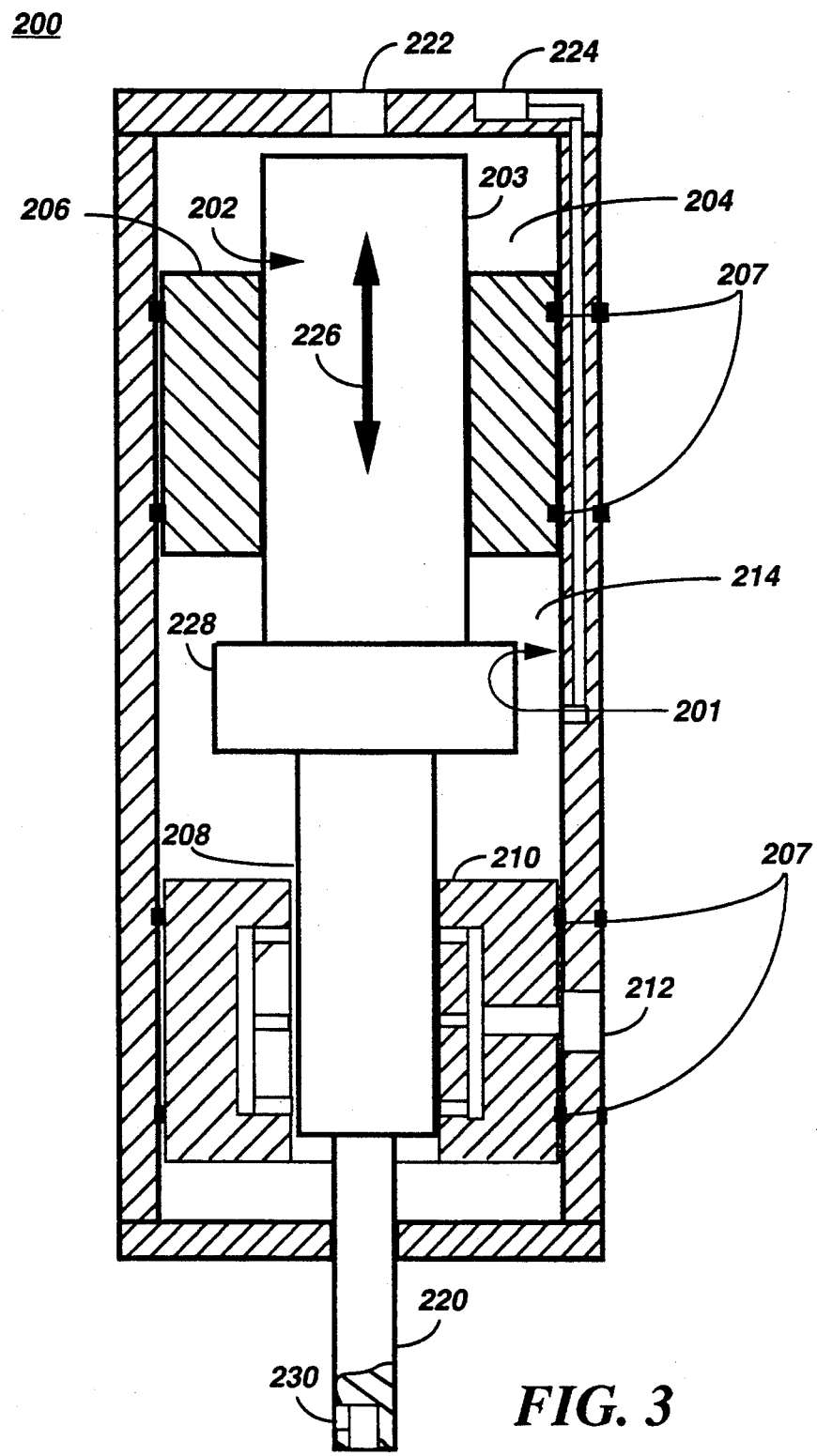
FIG. 3 is a cross-sectional side view illustrating the preferred embodiment of the programmable end-effector of FIG. 1 with the pressure being applied to the programmable end-effector.

FIG. 3 in a cross-sectional side view illustrating the programmable end-effector of FIG. 1 with the piston in the upper position. FIG. 3 is mechanically and operationally similar to the embodiment shown in FIG. 2, however, this embodiment illustrates the end-effector 200 when the air pressure at port 222 is disabled and the pressure at port 224 is enabled.

Figure 4:
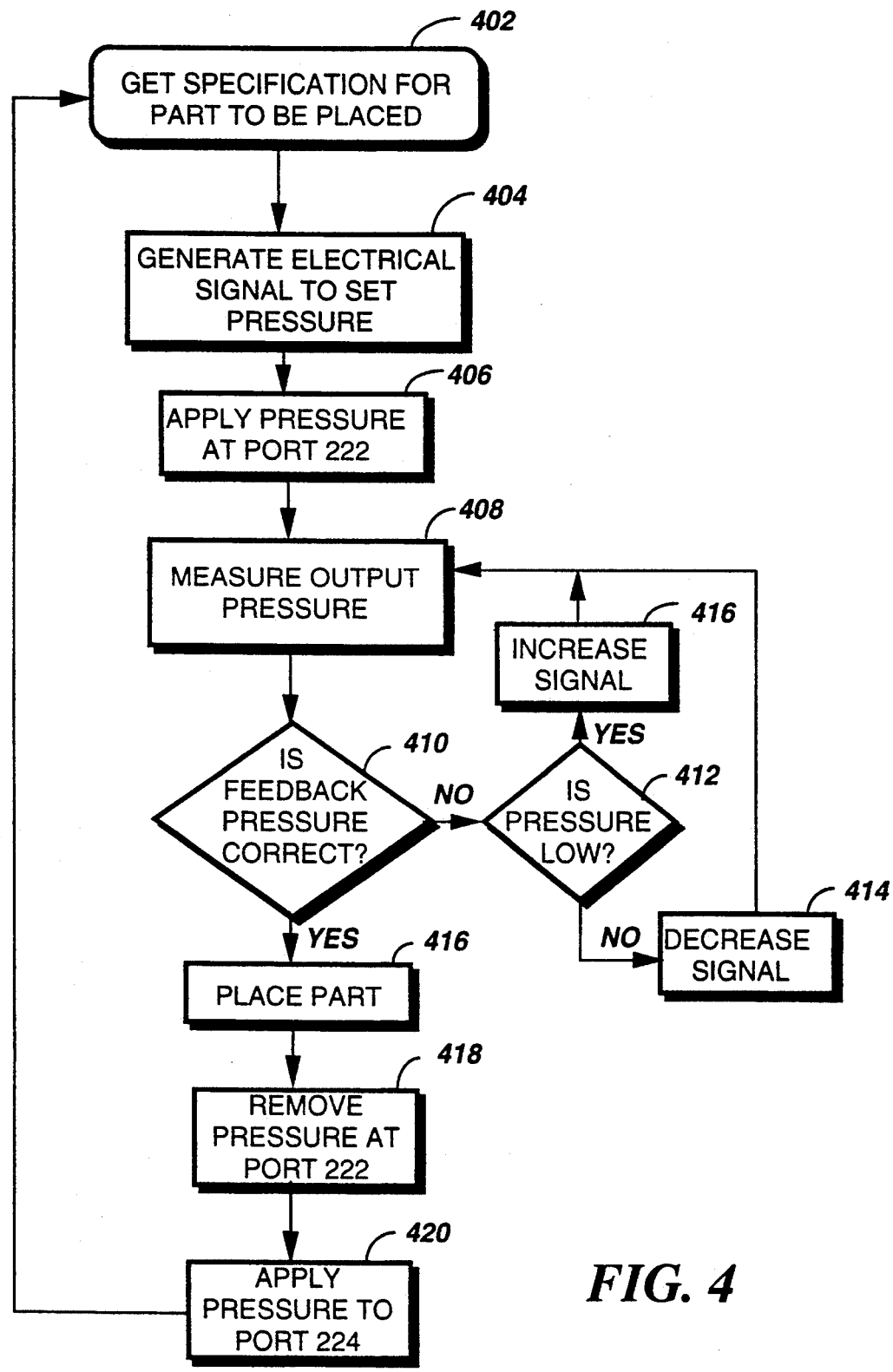
FIG. 4 is a flow diagram illustrating the operation of the robotic placement device in accordance with FIG. 1.

FIG. 4 is a flow diagram illustrating the operation of the robotic placement device in accordance with the preferred embodiment of the invention. Operationally, the specification of the part to be placed is retrieved from memory in the processor 108, step 402. More particularly, during step 402, from the specification stored within the processor, the precise electrical signal is obtained to set a desired force for placing the component part by establishing a corresponding pressure in the upper chamber of the programmable end-effector 200. The pressure within the lower chamber 214 being disabled. The electrical signal generated is converted from a digital signal to an analog signal and applied to the electro-pneumatic regulator, step 404. The electro-pneumatic regulator provides an air pressure responsive to the electrical signal being sent from the processor, step 404. The pressure is then applied to port 222 of the programmable end-effector, step 406. The output pressure being applied to port 222 is fed back to the control circuit which generates an electrical signal responsive to the pressure. The electrical signal is measured (or compared) by the processor to determine if the desired pressure has been established, step 408. The processor then, preferably by comparison, determines if the established pressure is correct, step 410. If not, step 412 determines when the pressure is too low, and increases the pressure, step 416, and the measurement and comparison continues until the precise pressure is measured at the output of the electro-pneumatic regulator. Those of ordinary skill in the art will appreciate that the pressure will vary linearly with the applied electrical signal. Alternately, when the pressure is too high, the electrical signal is decreased to decrease the pressure, step 414. When the pressure, at step 410, is measured correctly, the part is then placed, step 416.

Placing the component part involves lowering the programmable end-effector on the circuit-board, for example. Therefore, since the pressure is constantly verified, any change in the force at the tip of the programmable end-effector is reflected in the pressure which is constantly compensated to maintain a constant force on the component parts being placed.

When the part contacts the circuit board with the verified placement force, the vacuum is removed from the tip of the programmable end-effector to permit the release of the part from the programmable end-effector. Thereafter, the pressure is removed from port 222 which removed the force from the tip of the programmable end-effector, step 418. Applying a pressure at port 224 moves the piston vertically upward thereby breaking contact with the part.

In this way, the tip of the programmable end-effector places parts with a predetermined amount of force produced by precision air pressure regulation. Feedback from a transducer verifies that the correct force is "loaded" before contact. The z-coordinate (vertical movement) of the robot is literally any position in the compliance of the tip, and regardless of the amount of compliance force, the same force is applied on the component part being placed irrespective of the vertical position of the tip when the component part is being placed thereby eliminating z-coordinate (the vertical movement) from the list of critical placement criteria. Also, placement force unique to the component is stored in the part configuration which are downloaded to the controller when the part is to be placed. Additionally, because the air bearing is substantially frictionless in both the static and dynamic states, and there is no metal-to-metal contact or wear on the shaft, an increased life expectancy is achieved. The air bearing further gives the system high repeatability because of the low friction. Designing the shafts of the piston in a square or non-circular shape prevents rotation of the piston.

The total resistance transferred during compliance of the tip is given by the following:

$$F = P \times A + W + f$$

where

F = force during compliance;
P = pressure from electro-pneumatic regulator;
A = cross-sectional area of the cylindrical bore;
W = combined weight of both shafts; and
f = total friction of both shafts during compliance.

For example, functions such as picking up a flip chip from its tray would require the use of a programmable end-effector having a minimum force setting in order not to disturb the physical state of each solder ball. Applying force while picking components could compress the shape of the component. This problem is alleviated by designing the programmable end-effector with the piston capable of exerting a substantially less force when the component parts are being picked up. That is, by having a piston of approximately 20 grams, for example, and with the pressure disabled from port 222, the pick-up force is substantially less than the placement force which is controlled by the pressure at port 222. In this way, component parts can be picked up with minimum force and can be placed with a greater force irrespective of the vertical point of contact.

In summary, a robotic placement device comprises a programmable end-effector for picking and placing component parts. The programmable end-effector includes a cylinder having a piston, the piston includes a first and second shafts coupled together, the first shaft being larger than the second shaft. An O-ring seal is coupled to and divides the cylinder into two chambers wherein the first shaft is moveably coupled between the O-ring seal. A controller controls a pressure applied to the upper chamber for establishing a predetermined placement force at the programmable end-effector while placing component parts. An air-bearing is moveably coupled to the second shaft for providing substantially friction-free coupling therebetween as the piston moves vertically. A sensor senses the pressure in the first chamber and, in response thereto, generates an electrical signal. A processing means, coupled to the controlling means, processes the signal and, in response thereto, varies the pressure in the upper chamber for maintaining a substantially constant placement force to be exerted by the programmable end-effector on a circuit assembly. The processing means controls the placement force when the programmable end-effector moves vertically while in contact with the circuit assembly.

We claim:

1. A robotic placement device, comprising:
   a programmable end-effector for picking and placing component parts, the programmable end-effector comprising a cylinder having a piston including a first and second shafts coupled together, the first shaft being larger than the second shaft;
   a controlling means for controlling a pressure applied to the cylinder and the piston including the first and second shafts of said programmable end-effector establishes a predetermined placement force at the programmable end-effector while placing component parts;
   an air-bearing moveably coupled to the second shaft for providing substantially friction-free coupling therebetween as the piston moves vertically;
   means for sensing the pressure and in response thereto generating a signal; and
   a processing means, coupled to the controlling means, for processing the signal and in response thereto varying the pressure for maintaining a substantially constant placement force at the programmable end-effector while the programmable end-effector moves vertically.

2. The robotic placement device according to claim 1 wherein the programmable end-effector further comprising:
   an O-ring seal coupled to and dividing the cylinder into a first and second chambers wherein the first shaft is moveably coupled between the O-ring seal.

3. The robotic placement device according to claim 1 wherein said air-bearing further including an air pressure being applied to the air-bearing for evenly distributing a force on the perimeter of said second shaft for establishing the friction-free coupling therebetween.

4. The robotic placement device according to claim 1 further comprising:

the piston having a tip for picking and placing component parts;

a chamber for receiving air for establishing the pressure therein being applied to the first and second shafts of said piston wherein said piston being moveably coupled within said chamber; and wherein the processing means and the controlling means maintain the established pressure within the chamber while the piston moves vertically thereby providing the substantially constant placement force applied by the tip of the programmable end-effector to a circuit assembly.

5. The robotic placement device according to claim 1 the processing means further including means for varying the pressure applied to the programmable end-effector for providing a first force for picking up component parts and a second force for placing said component parts.

6. The robotic placement device according to claim 5 wherein the first force being substantially lesser than the second force.

7. In a robotic placement device, a method for controlling a placement force, comprising the steps of:

(a) applying a pressure to a programmable end-effector of the robotic placement device for establishing a predetermined force at a tip of the programmable end-effector, the programmable end-effector having a piston including a first and second shafts coupled together wherein the first shaft being larger than the second shaft, said step (a) of applying pressure further includes the step of applying a pressure to an air bearing moveably coupled to the second shaft of the piston wherein the pressure being applied is evenly applied to a perimeter of the second shaft at the air-bearing for providing a substantially frictionless coupling therebetween;

(b) sensing variations in the applied pressure;

(c) controlling an input and an exhaust to the pressure in response to step (b) for compensating for any variations in the applied pressure thereby permitting the piston to move in a vertical direction while maintaining the predetermined force at the tip of the programmable end-effector as the piston moves vertically.

8. The method according to claim 7 wherein the step of applying the pressure further including:

(d) applying a first pressure to a first chamber of the programmable end-effector for moving the piston within the first chamber;

(e) applying a second pressure to a second chamber enclosing a portion of the piston forming a coupling between the first shaft and the second shaft for moving the piston; and (f) said step of applying pressure to the air-bearing comprises applying a third pressure thereto.

9. The method according to claim 8 wherein the step of applying the first pressure includes the step of disabling the application of the first pressure when picking up the component part for exerting a second force lower than the predetermined force for picking up the component part.

10. A robotic placement device, comprising:

a programmable end-effector for picking and placing component parts, the programmable end-effector including a cylinder having a piston, the piston including a first and second shafts coupled together, the first shaft being larger than the second shaft;

an O-ring seal coupled to and dividing the cylinder into a first and second chambers wherein the first shaft is moveably coupled between the O-ring seal;

a controlling means for controlling a pressure applied to the first chamber for establishing a predetermined placement force at the programmable end-effector while placing component parts;

an air-bearing moveably coupled to the second shaft for providing substantially friction-free coupling therebetween as the piston moves vertically;

means for sensing the pressure in the first chamber and in response thereto generating a signal;

a processing means, coupled to the controlling means, for processing the signal and in response thereto varying the pressure in the first chamber for maintaining a substantially constant placement force being exerted by the programmable end-effector on a circuit assembly, said processing means controls the placement force when the programmable end-effector moves vertically while in contact with the circuit assembly.

* * * * *